(12) United States Patent
Hikmet et al.

(10) Patent No.: US 8,696,167 B2
(45) Date of Patent: Apr. 15, 2014

(54) ILLUMINATION SYSTEM, LIGHT SOURCE AND BEAM-CONTROL ELEMENT

(75) Inventors: Rifat Ata Mustafa Hikmet, Eindhoven (NL); Ties Van Bommel, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 672 days.

(21) Appl. No.: 12/676,632

(22) PCT Filed: Sep. 8, 2008

(86) PCT No.: PCT/IB2008/053618
§ 371 (c)(1),
(2), (4) Date: Mar. 5, 2010

(87) PCT Pub. No.: WO2009/034511
PCT Pub. Date: Mar. 19, 2009

(65) Prior Publication Data
US 2011/0128739 A1    Jun. 2, 2011

(30) Foreign Application Priority Data
Sep. 11, 2007 (EP) .................................. 07116091

(51) Int. Cl.
*F21V 17/02* (2006.01)
(52) U.S. Cl.
USPC .......................................................... 362/282
(58) Field of Classification Search
USPC .......................................................... 362/282
See application file for complete search history.

(56) References Cited

U.S. PATENT DOCUMENTS

| | | |
|---|---|---|
| 2,438,196 A * | 3/1948 | Washington ................. 362/293 |
| 3,860,812 A | 1/1975 | Schneider |
| 4,712,882 A | 12/1987 | Baba et al. |
| 4,783,155 A | 11/1988 | Imataki et al. |
| 4,951,183 A | 8/1990 | Wang |
| 5,223,971 A | 6/1993 | Magel |
| 5,438,486 A | 8/1995 | McNair |
| 5,774,273 A | 6/1998 | Bornhorst |
| 6,188,526 B1 | 2/2001 | Sasaya et al. |
| 6,542,309 B2 | 4/2003 | Guy |

FOREIGN PATENT DOCUMENTS

| | | |
|---|---|---|
| DE | 3926618 A1 | 2/1991 |
| DE | 202004009836 U1 | 9/2004 |
| WO | 2006072885 A1 | 7/2006 |

* cited by examiner

*Primary Examiner* — Anh Mai
*Assistant Examiner* — Hana Featherly
(74) *Attorney, Agent, or Firm* — John Salazar; Mark Beloborodov

(57) ABSTRACT

The invention relates to an illumination system (50), a beam-control element and a light source (30). The illumination system comprises the light source for emitting a light beam and a beam-control element for controlling the shape and/or direction of the light beam. The beam-control element comprises a resilient layer (2a) and a further layer (4a) being arranged substantially parallel to each other, the resilient layer comprising a relief (21) on a surface of the resilient layer arranged substantially parallel to the further layer, or the further layer comprising the relief on a surface of the further layer facing the resilient layer. The illumination system further comprises moving means (52) for moving the resilient layer and the further layer with respect to each other for reducing the relief by applying a pressure between the resilient layer and the further layer. The relief controls the shape and/or direction of the light-beam. When the relief is reduced by applying pressure, the light beam is substantially unaltered by the beam-control element.

14 Claims, 11 Drawing Sheets

# ILLUMINATION SYSTEM, LIGHT SOURCE AND BEAM-CONTROL ELEMENT

FIELD OF THE INVENTION

The invention relates to an illumination system comprising a light source and a beam-control element.

The invention also relates to a light source and a beam-control element for use in the illumination system, and a flashlight.

BACKGROUND OF THE INVENTION

Illumination systems having a light source and a beam-control element are well known in the art. They are used, inter alia, in spotlights, flashlights, vehicle headlights, shop lights and office lights. Beam control is often required to increase or decrease the degree of collimation of the illumination system. For example, when illuminating an item which is located relatively nearby, less collimation is required compared to items located further away. Also the intensity of the light illuminating an item may be adapted by adapting the degree of collimation of the illumination system.

An illumination system having a light source and means for controlling the degree of collimation of the emitted light is, for example, known from U.S. Pat. No. 4,951,183. In this US patent, a flashlight with a variable light beam is disclosed, which includes a tube with a head provided at a front end. A light reflector is disposed in a front end of the head. A casing is force-fitted within the front end of the tube. A switch is fixed on the casing. An end cap, a spring and an end plate are disposed in an insulator which is received in a retainer. A light bulb is retained in the retainer. The switch controls an electrical circuit of the flashlight. The light bulb is stable relative to the tube, so that a rotation of the head relative to the tube makes the light reflector move relative to the light bulb. Due to this moving of the light bulb relative to the light reflector, the width of the light beam emitted by the flashlight is altered.

A drawback of this flashlight is that a relatively large movement of the light reflector relative to the light bulb is required to alter the width of the light beam emitted from the flashlight.

SUMMARY OF THE INVENTION

It is an object of the invention to provide an illumination system having a beam-controlling element in which a relatively small displacement is required for widening the light beam.

According to a first aspect of the invention the object is achieved with an illumination system as claimed in claim 1. The illumination system according to the invention comprises a light source for emitting a light beam and a beam-control element for controlling the shape and/or direction of the light-beam, the light source being arranged for emitting at least part of the light beam via the beam-control element, the beam-control element comprising a resilient layer and a further layer being arranged substantially parallel to the resilient layer, the resilient layer comprising a relief on a surface of the resilient layer arranged substantially parallel to the further layer, or the further layer comprising the relief on a surface of the further layer facing the resilient layer, the relief being arranged for altering the shape and/or direction of the light-beam, the illumination system further comprising moving means for moving the resilient layer and the further layer with respect to each other for reducing the relief by applying pressure between the resilient layer and the further layer.

The controlling of the shape and/or direction includes controlling the collimation of the light-beam.

The effect of the illumination system according to the invention is that the beam-control element may control the shape and/or direction of the light-beam by moving the resilient layer against the further layer and applying pressure between the resilient layer and the further layer. Due to the presence of the relief, the shape and/or direction of the light beam is altered, for example, redirected or reshaped, for example, diffused. When the resilient layer and the further layer are pressed against each other, the resilient layer causes the relief to be reduced and thus reduces the redirection and/or diffusion of the light beam, thereby substantially restoring the original shape and/or direction of the light beam. Typically, the dimensions of the structures constituting the relief are relatively small. Thus, only a relatively small displacement of the resilient layer and the further layer with respect to each other is necessary for reducing the relief and controlling the light beam emitted from the illumination system. When, for example, the resilient layer comprises the relief, the pressing of the relief against the further layer causes deformation of the structures of the relief, which reduces the relief. When, for example, the further layer comprises the relief, the pressing of the resilient layer against the relief causes the resilient substance of the resilient layer to fill the structures of the relief, which reduces the relief and substantially restores the original shape and/or direction of the light-beam.

The beam-control element of the illumination system according to the invention may, for example, be used in transmission or in reflection. When the beam-control element is used in transmission, the beam-control element is placed in the light path of the light-beam for controlling the shape and/or direction of the light-beam. Typically, both the resilient layer and the further layer are translucent. A benefit of this embodiment is that it results in a relatively simple and cost-effective construction of the illumination system. Alternatively, the beam-control element may be used in reflection. When the beam-control element is used in reflection, the beam-control element may further comprise a reflective layer. The light beam, for example, impinges on the beam-control element and is transmitted by the resilient layer and the further layer to reach the reflective layer. The reflective layer is preferably arranged such that the reflective layer reflects the light of the light beam again via the further layer and the resilient layer in a direction away from the beam-control element. In such an embodiment, the light of the light beam is transmitted by the resilient layer and the further layer twice. A benefit that is achieved when the light of the light-beam passes the resilient layer and the further layer twice is that the dimensions of the structures forming the relief may be reduced substantially compared to the arrangement of the beam-control element in transmission, while achieving a similar effect. The reduction of the dimensions of the structures of the relief has the additional benefit that the pressure required to reduce the relief is also reduced.

In an embodiment of the illumination system, the moving means are arranged for moving the resilient layer and the further layer with respect to each other in the axial direction, being a direction substantially parallel to the light beam, for applying the pressure.

In a further embodiment of the illumination system, the moving means are arranged for moving the resilient layer and the further layer with respect to each other in the transversal direction and/or rotational direction for altering the relief, the transversal direction and rotational direction being directions` substantially perpendicular to the light beam. When the further layer, for example, is configured to move via a rotational movement along a thread towards the resilient layer, the moving means comprise a combination of the translational movement in axial direction along the thread and a rotational movement when rotating the further layer along the thread. A benefit of this embodiment is that it comprises a relatively simple and cost-effective construction.

In an embodiment of the illumination system, the relief comprises microstructures. A benefit when using microstructures is that the redirection of the light beam or the reshaping of the light beam using microstructures generally results in a relatively uniform light distribution in the redirected or reshaped light beam. A further benefit when using microstructures is that less movement of the resilient layer and the further layer with respect to each other is required, and that typically less pressure is required for reducing the relief. Microstructures typically are structures which have a dimension substantially parallel to the resilient layer or to the further layer which is smaller than 1 millimeter. A further dimension of the microstructures substantially parallel to the resilient layer or the further layer may be larger than 1 millimeter. In the known illumination system, the homogeneity of the emitted light beam varies during the movement of the light reflector relative to the light bulb. In the illumination system according to the invention, the use of microstructures results in a relatively uniform control of the light beam. The microstructures may, for example, be elongated microstructures having a length dimension and a width dimension both parallel to the resilient layer or the further layer. Such elongated microstructures may, for example, be scratches or cylindrical lens elements in which the width dimension is smaller than 1 millimeter and the length dimension may be larger.

In an embodiment of the illumination system, the relief is arranged for reflecting the light beam. The resilient layer or the further layer may, for example, be translucent to transmit the light beam before the light beam is reflected from the relief. Alternatively, when the relief is arranged on the resilient layer, the further layer may be arranged on a side of the relief facing away from the impinging light beam.

In an embodiment of the illumination system, the resilient layer and the further layer are translucent layers. A benefit of this embodiment is that the beam-shaping effect and/or the redirecting effect of the relief are relatively simple to predict due to the transmission of the light-beam.

In an embodiment of the illumination system, the resilient translucent layer comprises the relief at a surface facing the further layer. A benefit of this embodiment is that the relief is relatively simple to produce.

In an embodiment of the illumination system, the surface of the resilient layer comprising the relief is embedded in the resilient layer. A benefit of this embodiment is that by embedding the relief inside the resilient layer, the relief is protected against contamination, such as dirt, which may influence its ability to be altered by applying pressure.

In an embodiment of the illumination system, the resilient layer comprises embedded compartments forming the relief.

In an embodiment of the illumination system, the compartments comprise a fluid being evacuated from the compartment by pressing the resilient layer for reducing the relief. The fluid may, for example, be air which is pressed out of the compartments. The resilient layer may, for example, comprise a foam which comprises the compartments filled with air which, when pressed, evacuate the air and reduce the relief. A benefit of this embodiment is that it is relatively simple to produce.

In an embodiment of the illumination system, the further layer is relatively rigid compared to the resilient layer. A benefit of this embodiment is that only a single resilient layer is required for the beam-shaping element according to the invention. Generally, resilient translucent material comprises polymers for obtaining the resilient character. However, polymers generally degrade over time when exposed to light and become brittle, which reduces the resilient character of the resilient layer. Due to the reduced resilient character of the resilient layer, the ability of the resilient layer to reduce the relief is reduced. To use the resilient layer over a considerable amount of time, the resilient layer may, for example, be made of silicon rubber, which is relatively expensive. Therefore, the illumination system according to the current embodiment in which a single resilient layer is required may be produced in a relatively cost-effective manner.

In an embodiment of the illumination system, the refractive index of the resilient layer is substantially identical to the refractive index of the further layer. In the embodiment in which the further layer comprises the relief, and when the further layer is relatively rigid compared to the resilient layer, the pressing of the resilient layer against the further layer reduces the relief. The reduction of the relief is caused by the resilient substance filling the structures of the relief. When the refractive index of the resilient layer substantially matches the refractive index of the further layer, the filling of the structures of the relief results in a substantially optically homogeneous layer. Such an optically homogeneous layer does not alter the shape and/or direction of the light beam. However, when the refractive index of the resilient layer does not match the refractive index of the further layer, the filling of the protrusions and/or indentations of the relief does not result in an optically homogeneous layer. In such an embodiment, the relief remains optically present due to the difference in refractive index, thus still controlling the light beam to some extent.

In an embodiment of the illumination system, the relief comprises an arrangement of circular lens-shaped, cylindrical lens-shaped, prism-shaped, or substantially randomly shaped protrusions, indentations, or compartments. A benefit when using circular lens-shaped protrusions, indentations, or compartments is that the widening of the light beam which interacts with the relief is in substantially two dimensions. When using cylindrical lens-shaped protrusions, indentations, or compartments in the relief, the widening of the light beam which interacts with the relief is mainly in a direction perpendicular to a longitudinal axis of the cylindrical lens-shaped protrusions, indentations, or compartments. When using prism-shaped protrusions, indentations, or compartments in the relief, the light which interacts with the relief is re-directed by the individual prism-shaped protrusions, indentations, or compartments. When the prism-shaped protrusions, indentations, or compartments are substantially identical and arranged substantially parallel to each other, the light-beam which interacts with the relief is re-directed. By reducing the relief via the translucent resilient layer, the shape and/or direction of the light-beam is restored. Of course, the relief may comprise any combination of the differently shaped protrusions, indentations, or compartments.

In an embodiment of the illumination system, the protrusions, indentations, or compartments comprise a holographic diffuser pattern. A benefit of this embodiment is that such a holographic diffuser pattern can give very precise control over the shape, direction and collimation of the light-beam. With such holograms it may even be possible to produce holographic images. When the holographic diffuser pattern is reduced, the control of the shape, direction and collimation of the holographic image produced by the holographic diffuser pattern is also reduced.

In an embodiment of the illumination system, the moving means move the resilient layer relative to the further layer via a rotational motion causing a translational motion along a thread, a piezo-electric element, an electro-magnetic force, or a motor. A benefit when using a rotational motion of, for example, the further layer to cause a translational motion along a helical thread is that it can be implemented relatively easily and cost-effectively. Especially when using this beam-control element in, for example, a flashlight, it is important to have a relatively cost-effective implementation of the beam-control element. In a flashlight, a light output window is generally provided to protect a user from touching the light source. This light output window is often mounted on the flashlight via a flange which is screwed to the housing of the flashlight. This light output window may, for example, constitute or comprise the further layer of the beam-control element. The collimator of the light source in the flashlight may, for example, comprise the resilient layer which comprises the relief. The relative movement between the further layer and the resilient layer may then, for example, be generated by screwing the flange comprising the light output window onto the housing, thereby reducing the relief.

In an embodiment of the illumination system, both the surface of the resilient layer arranged substantially parallel to the further layer and the surface of the further layer facing the resilient layer comprise the relief. A benefit of this embodiment in which both the resilient layer and the further layer have a relief, is that the depth of the protrusions and/or indentations of the individual reliefs may be reduced to obtain a required controlling effect of the beam-control element on the light-beam. Furthermore, this embodiment enables to use a differently shaped relief on the surface of the resilient layer compared to the relief on the surface of the further layer.

In an embodiment of the illumination system, the relief of the resilient layer and the relief of the further layer are substantially complementary reliefs. The use of matching complementary reliefs being movable with respect to each other for shaping a light beam is already known from DE 3926618. However, a drawback of this system is that a relatively high accuracy is required to fit the matching complementary reliefs such that the light is not altered by the matching complementary reliefs. This is especially critical when the reliefs comprise microstructures. Due to the use of the resilient layer, the required accuracy may be reduced. The reduction in the required accuracy is caused by the resilient layer, which adapts to any inaccuracies in the substantially complementary reliefs or in the mechanical constructions for moving the resilient layer and the further layer with respect to each other. Furthermore, when using substantially complementary reliefs, the pressure required to reduce the reliefs may be considerably less compared to the embodiment in which one of the resilient layer or the further layer is substantially flat.

According to a second aspect of the invention, the object is achieved with a beam-control element as claimed in claim 18. The beam-control element according to the invention comprises a resilient layer and a further layer being arranged substantially parallel to the resilient layer, the resilient layer comprising a relief on a surface of the resilient layer arranged substantially parallel to the further layer, or the further layer comprising the relief on a surface of the further layer facing the resilient layer, the relief being arranged for altering the shape and/or direction of the light beam, the beam-control element further comprising moving means for moving the resilient layer and the further layer with respect to each other in a direction of the light beam (40) for reducing the relief by applying pressure between the resilient layer and the further layer.

According to a third aspect of the invention, the object is achieved with a light source as claimed in claim 20. The light source according to the invention comprises a light emitting element and a collimator for generating a collimated light beam, a light exit window of the light source comprising the resilient layer comprising the relief. The light emitting element may, for example, be a light emitting diode or an ultra-high-pressure lamp.

According to a fourth aspect of the invention, the object is achieved with a flashlight as claimed in claim 19 or 21.

BRIEF DESCRIPTION OF THE DRAWINGS

These and other aspects of the invention are apparent from and will be elucidated with reference to the embodiments described hereinafter.

In the drawings.

The figures are purely diagrammatic and not drawn to scale. Particularly for clarity, some dimensions are exaggerated strongly. Similar components in the figures are denoted by the same reference numerals as much as possible.

DETAILED DESCRIPTION OF EMBODIMENTS

Figure 1A:
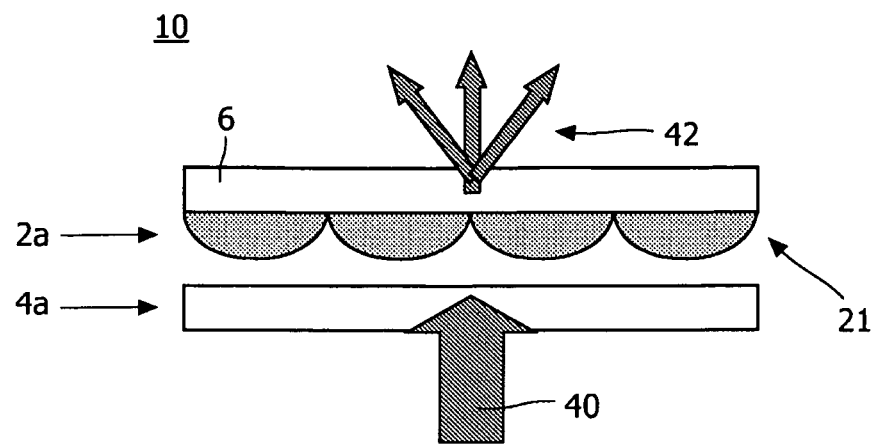
FIGS. 1A and 1B show schematic cross-sectional views of a beam-control element according to the invention, in which the resilient layer comprises the relief for reshaping the collimated light beam.
Figure 1B:
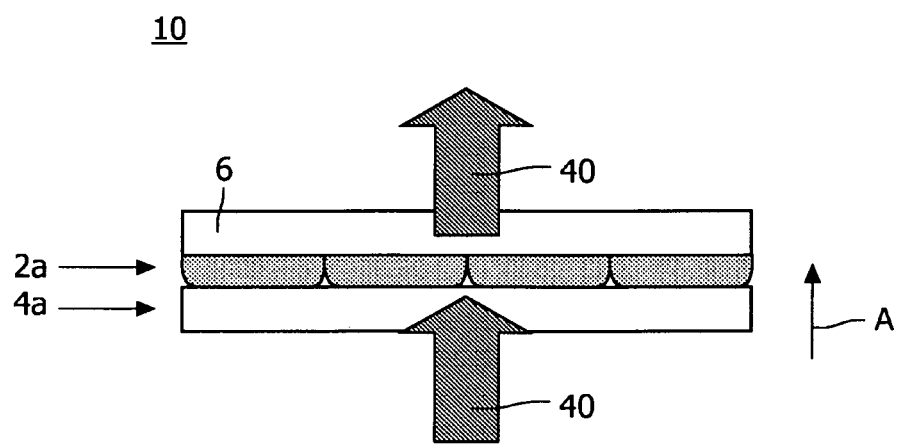

FIGS. 1A and 1B show schematic cross-sectional views of a beam-control element 10 according to the invention. The beam-control element 10 comprises a resilient layer 2a and a further layer 4a, which are arranged substantially parallel to each other and substantially perpendicular to the light-beam 40 impinging on the beam-control element 10 from a light source (not shown). The beam-control element 10 according to the invention further comprises moving means 52, 62 (see FIGS. 8 and 9), which are not shown in the schematic illustrations of FIGS. 1A and 1B for clarity reasons. In the beam-control element 10 as shown in FIGS. 1A and 1B, a surface of the resilient layer 2a which faces the further layer 4a comprises a relief 21. The relief 21 is arranged for controlling the light beam 40 impinging on the beam-control element 10. In the embodiment shown in FIGS. 1A and 1B, the relief 21 is constituted of a plurality of circular, lens-shaped protrusions or a plurality of cylindrical, lens-shaped protrusions. When a light beam 40 impinges on the relief 21, a shape of the light beam 40 is altered by the relief 21. For example, when the relief 21 is constituted of a plurality of circular, lens-shaped protrusions, the relief 21 widens the light beam 40 in two dimensions parallel to the resilient layer 2a. When the relief 21 is constituted of a plurality of cylindrical, lens-shaped protrusions, the widening of the light beam 40 due to the relief 21 is only in one dimension, being perpendicular to a central axis (not shown) of the cylindrical, lens-shaped protrusions as indicated by the arrows 42. In the cross-sectional schematic view of FIGS. 1A and 1B, the widening of the light-beam 40, when using cylindrical, lens-shaped protrusions, is in the plane of the cross-section shown in FIG. 1A.

FIG. 1A shows the resilient layer 2a and the further layer 4a spaced apart from each other. As a consequence, the relief 21 controls the light-beam 40 so as to form a substantially diffuse light beam 42. In the embodiment shown in FIG. 1A, the resilient layer 2a is arranged on a translucent substrate 6. The substrate 6 may be translucent and, for example, may be constituted of glass or quartz or an alternative translucent material. FIG. 1B shows the resilient layer 2a and the further layer 4a when pressed against each other by moving the resilient layer 2a and/or the further layer 4a along an axial direction A. Due to the resilient character of the resilient layer 2a, the relief 21 is reduced by the pressure applied between the resilient layer 2a and the further layer 4a. The applied pressure determines the level of reduction of the relief 21 and thus determines the level of restoring the shape and/or direction of the light beam transmitted by the beam-control element 10.

The further layer 4a may, for example, be relatively rigid compared to the resilient layer 2a. Alternatively, the further layer 4a may also be resilient (not shown). A benefit when the further layer 4a also is resilient is that typically less pressure is required for reducing the relief 21, because both the resilient layer 2a and the further layer 4a can adapt to reduce the relief 21. The resilient layer 2a may be constituted of a single resilient translucent material or may, for example, be constituted of a resilient material which is sealed in a flexible membrane (not shown). The resilient material sealed in the flexible membrane may, for example, be a fluid. In the embodiment shown in FIGS. 1A and 1B, the sealing membrane comprises the relief 21. A benefit of this embodiment is that only the flexible membrane is made of, for example, a polymer, while the fluid may be substantially any fluid which is translucent to the light of the light beam, for example, water or air.

The relief 21 may be generated, for example, by etching the relief 21 in the resilient layer 2a, for example, via lithography. The resilient layer 2a may also be constituted of a monomer which may, for example, be cast into a mould. After polymerization, the resilient layer 2a is created. The relief 21 may be part of the mould and may be generated when casting the monomer into the mould. Subsequent polymerization of the monomer generates the resilient layer 2a comprising the relief 21. Alternatively, the surface structures forming the relief 21 may be formed using a focused laser beam. Alternatively, holographic means are used to produce a holographic diffuser within the relief 21 which provides relatively good control over the shape and/or direction of the beam. Many other known techniques for producing a relief on or in a layer may be applied to form the relief 21.

Figure 2A:
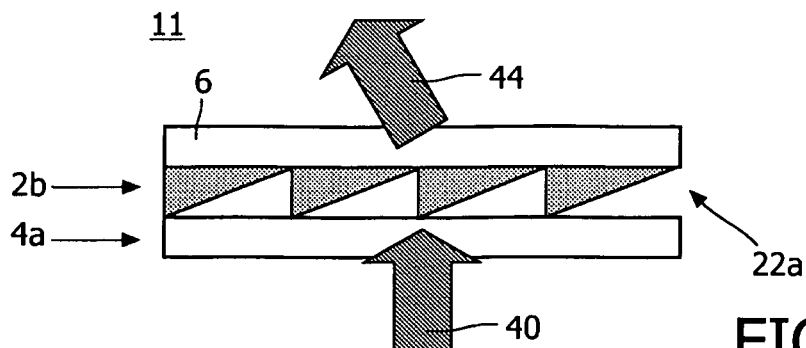
FIGS. 2A, 2B, 2C and 2D show schematic cross-sectional views of a beam-control element according to the invention, in which the resilient layer comprises the relief for redirecting the collimated light beam.
Figure 2B:
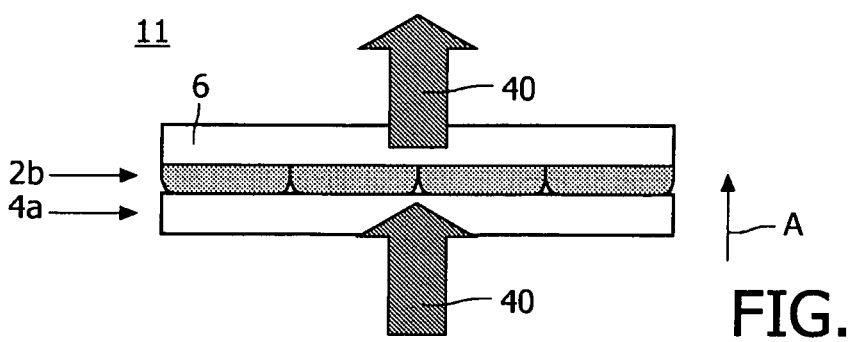

FIGS. 2A, 2B, 2C and 2D show schematic cross-sectional views of an alternative embodiment of the beam-control element 11 according to the invention. In the embodiment shown in FIGS. 2A and 2B, the resilient layer 2b is arranged on a translucent substrate 6 and comprises the relief 22a which is constituted of a plurality of prism-shaped protrusions for redirecting the impinging light beam 40 to a redirected light beam 44. The prism-shaped protrusions may, for example, be elongated prisms stretching out perpendicularly to the cross-section shown in FIGS. 2A and 2B. FIG. 2A shows the resilient layer 2b spaced apart from the further layer 4a such that the relief 22a redirects the light beam 40 to the redirected light beam 44. FIG. 2B shows the resilient layer 2b pressed against the further layer 4a after having been moved in an axial direction A. Due to the applied pressure between the resilient layer 2b and the further layer 4a, the relief 22a is reduced and the prism-shaped protrusions are deformed by the pressure into a substantially homogeneous layer of resilient translucent material. Due to the reduction of the relief 22a, the beam-control element 11 no longer redirects the impinging light beam 40, which is substantially transmitted through the beam-control element 11 unaltered.

As indicated before, the further layer 4a may be either relatively rigid compared to the resilient layer, or may, for example, also be resilient. And again, the resilient layer 2b may be constituted of a fluid sealed in a flexible membrane.

Figure 2C:
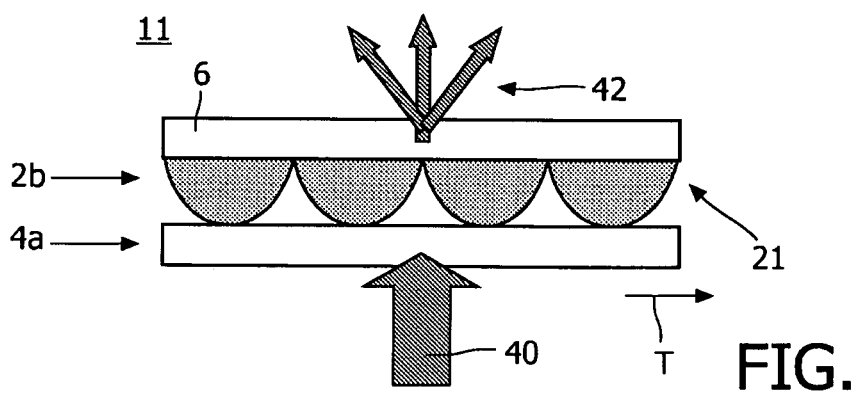
Figure 2D:
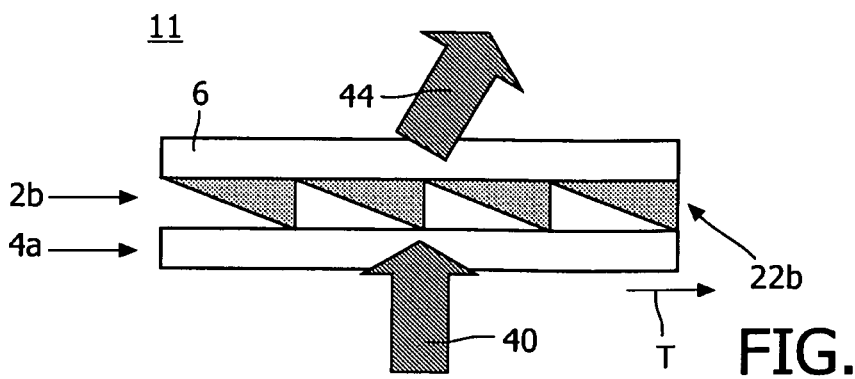

FIGS. 2A, 2C and 2D show an additional embodiment in which the further layer 4a is moved in a transversal direction T with respect to the resilient layer 2b. In FIG. 2C, the moving of the further layer 4a in the transversal direction T changes the shape of the relief 22a (see FIG. 2A) by applying a pressure against the relief 22a such that it changes substantially into a relief 21 which controls the light beam 40 so as to become a substantially diffuse light beam 42. When the further layer 4a is moved further in the transversal direction T, the relief 21 of FIG. 2C may be altered to the relief 22b as shown in FIG. 2D. The relief 22B as shown in FIG. 2D again is constituted of a plurality of prism-shaped protrusions for redirecting the impinging light beam 40 to a redirected light beam 44, but in a different direction compared to the embodiment shown in FIG. 2A.

The embodiments shown in FIGS. 2A, 2C and 2D may also be obtained when moving the further layer 4a in a rotational direction (not shown) with respect to the resilient layer 2b. Of course the same effect is achieved when moving the resilient layer 2b with respect to the further layer 4a.

Figure 3A:
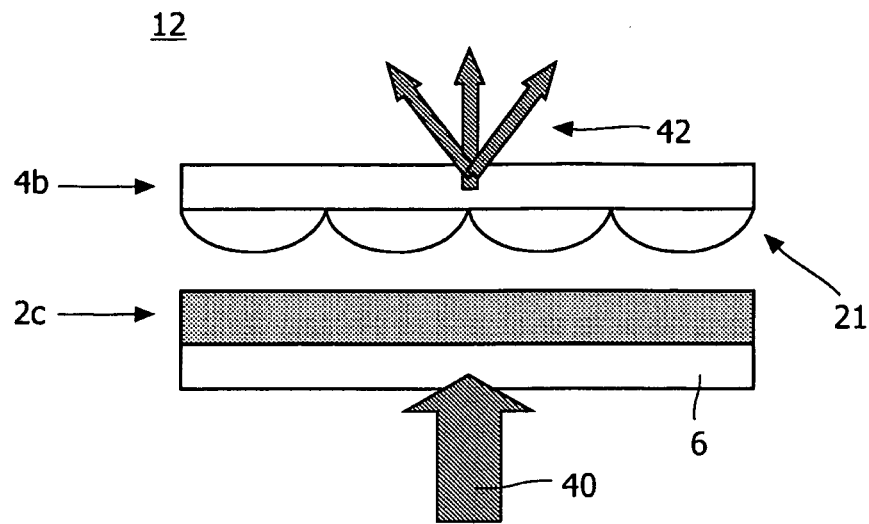
FIGS. 3A and 3B show schematic cross-sectional views of a beam-control element according to the invention, in which the further layer comprises the relief for reshaping the collimated light beam.
Figure 3B:
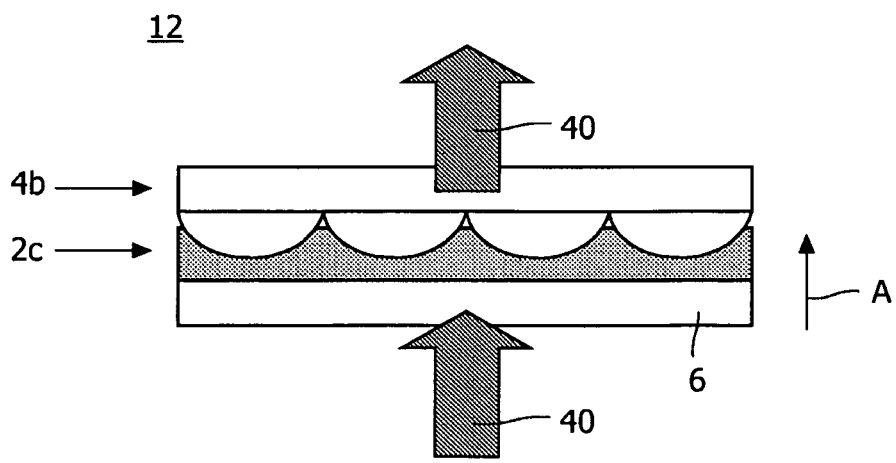

FIGS. 3A and 3B show schematic cross-sectional views of a beam-control element 12 according to the invention, in which the further layer 4b comprises the relief 21 for reshaping the light beam 40. The relief 21 again is constituted of a plurality of circular, lens-shaped protrusions or cylindrical, lens-shaped protrusions, resulting in a two-dimensional widening of the light beam or a one-dimensional widening of the light-beam 40, respectively. The resilient layer 2c is a relatively flat resilient layer 2c, which may be constituted of a single resilient material or of a fluid sealed in a flexible membrane. FIG. 3A shows the further layer 4b spaced apart from the resilient layer 2c, such that the relief 21 controls the shape of the light beam 40 as it progresses through the beam-controlling element 12. FIG. 3B shows the further layer 4b pressed against the resilient layer 2c, such that the relief 21 is reduced. In the example shown in FIGS. 3A and 3B, the further layer 4b is relatively rigid compared to the resilient material of the resilient layer 2c and thus, due to the pressure applied between the resilient layer 2c and the further layer 4b, the relatively flat resilient translucent material of the resilient layer 2c is pressed into a substantially complementary shape compared to the relief 21 of the further layer 4b. The resilient translucent material of the resilient layer 2c substantially fills the gaps between the circular or cylindrical lens-shaped protrusions of the relief 21 of the further layer 4b, such that the relief 21 is reduced. Preferably, the resilient layer 2c and the further layer 4b substantially have the same refractive index. When the resilient layer 2c and the further layer 4b do not have the same refractive index, the filling of the gaps between the protrusions of the relief 21 only alters the relief due to the difference in refractive index, but does not optically remove the relief 21. When the resilient layer 2c and the further layer 4b do have the same refractive index, the filling of the gaps between the protrusions of the relief 21 also optically removes the relief 21, such that the light beam 40 which impinges on the beam-control element 12 may pass unaltered, as is shown in FIG. 3B.

The further layer 4b may, for example, be constituted of glass or quartz, wherein the relief 21 may be etched into the glass or quartz. Alternatively, the further layer 4b may be constituted of a plastic material which is more rigid than the resilient translucent material of the resilient layer 2c, for example Polymethylmethacrylaat (PMMA) or Polystyrene (PS) or Polycarbonate (PC).

Figure 4A:
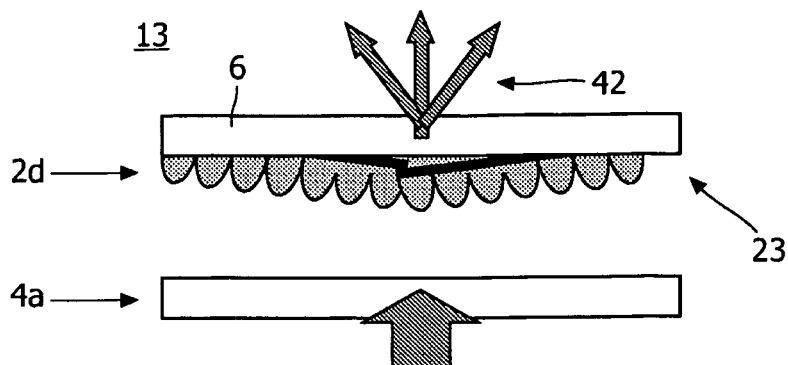
FIGS. 4A and 4B show schematic cross-sectional views of the beam-control element, in which the surface of the resilient layer comprising the relief has an overall curved shape.
Figure 4B:
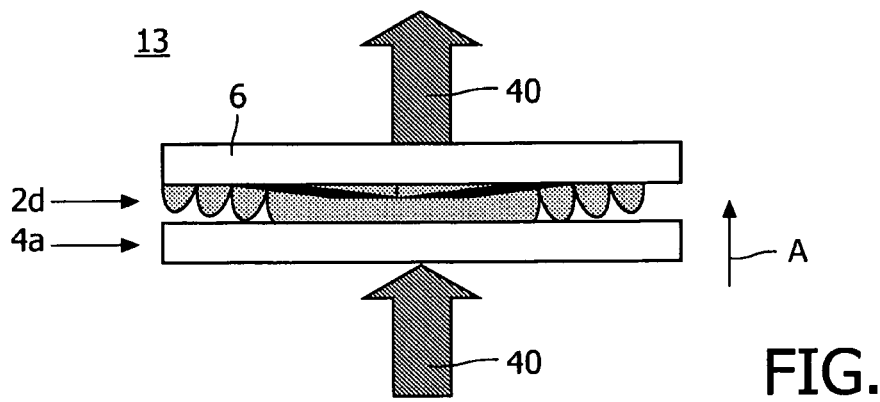

FIGS. 4A and 4B show schematic cross-sectional views of the beam-control element 13, in which the surface of the resilient layer 2d comprising the relief 23 has an overall curved shape. Such an overall curved shape of the relief 23 has the benefit that the relief 23, when the resilient layer 2d is pressed against the further layer 4a, disappears gradually. This enables a gradual conversion from a diverted light beam 42 towards a collimated light beam 40. A further benefit of this embodiment is that it enables a gradual release of the resilient layer 2d from the further layer 4a, which may be beneficial when the resilient layer 2d is relatively sticky.

Figure 5A:
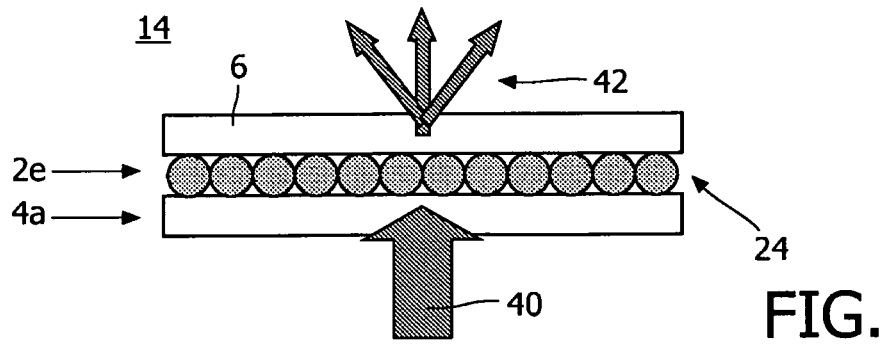
FIGS. 5A and 5B show schematic cross-sectional views of the beam-control element, in which the resilient layer comprises resilient particles.
Figure 5B:
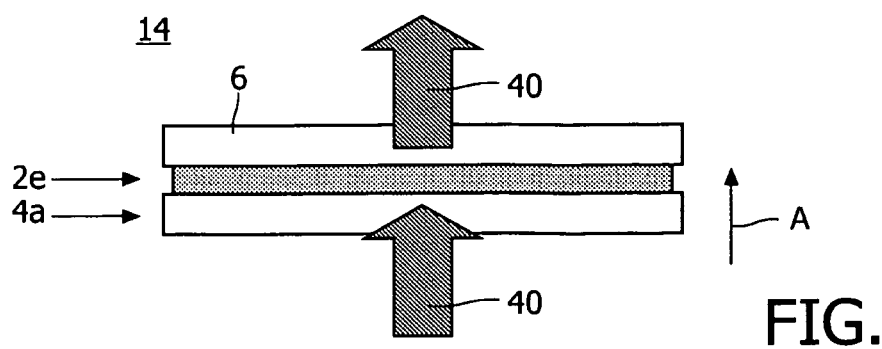

FIGS. 5A and 5B show schematic cross-sectional views of the beam-control element 14, in which the resilient layer 2e comprises resilient particles 24. The use of resilient particles 24 increases the surface of the relief 24, thus increasing the scattering effect. When pressure is applied, as is shown in FIG. 5B, the resilient effect of the particles 24 makes the resilient layer 2e substantially uniform, thus reducing the relief 24 and allowing the impinging light beam 40 to pass substantially unaltered.

Figure 6A:
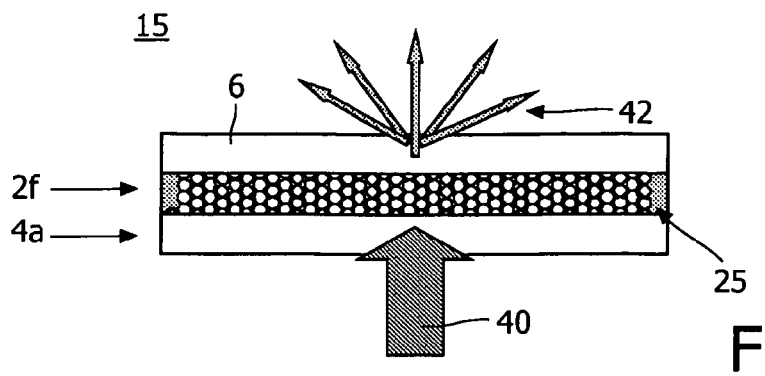
FIGS. 6A and 6B show schematic cross-sectional views of the beam-control element, in which the resilient layer comprises a sponge-like structure.
Figure 6B:
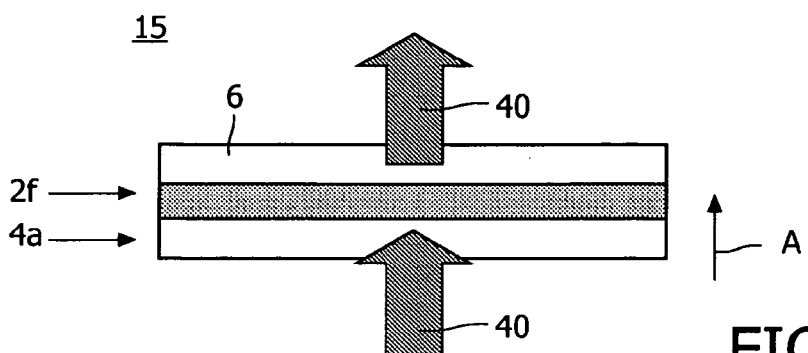

FIGS. 6A and 6B show schematic cross-sectional views of the beam-control element 15, in which the resilient layer 2f comprises a sponge-like structure 25. Also the sponge-like structure 25 increases the surface of the relief 25, which increases the scattering effect of the resilient layer 2f. The resilient layer 2f may, for example, be filled with air in the un-pressurized state as shown in FIG. 6A. When the resilient layer 2f is pressurized (see FIG. 6B), the air is pressed out of the resilient layer 2f which is compressed to a substantially uniform layer 2f, which enables the impinging light beam 40 to pass substantially unaltered.

Figure 7A:
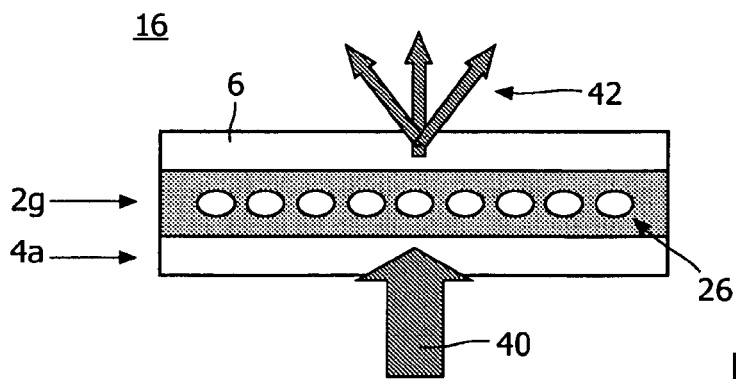
FIGS. 7A and 7B show schematic cross-sectional views of the beam-control element, in which the resilient layer comprises compartments.
Figure 7B:
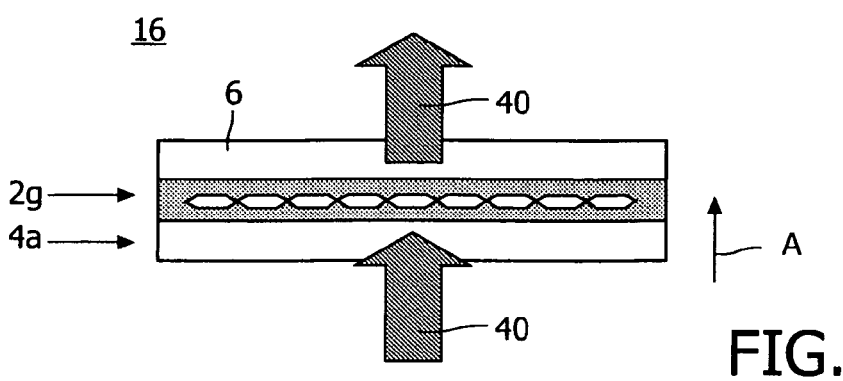

FIGS. 7A and 7B show schematic cross-sectional views of the beam-control element 16, in which the resilient layer 2g comprises compartments 26. The compartments 26 may be filled with a fluid having a different refractive index compared to the remainder of the resilient layer 2g. The compartments 26 may comprise air, or water, or any other suitable fluid. In the un-pressurized state as shown in FIG. 7A, the impinging light beam 40 is diffracted by the compartments 26, resulting in a substantially diffusely scattered light beam 42. When a pressure is applied between the resilient layer 2g and the further layer 4a, the compartments deform into a substantially homogeneous layer inside the resilient layer 2g, as is shown in FIG. 7B. Again, the impinging light beam 40 may pass substantially unaltered.

Figure 8A:
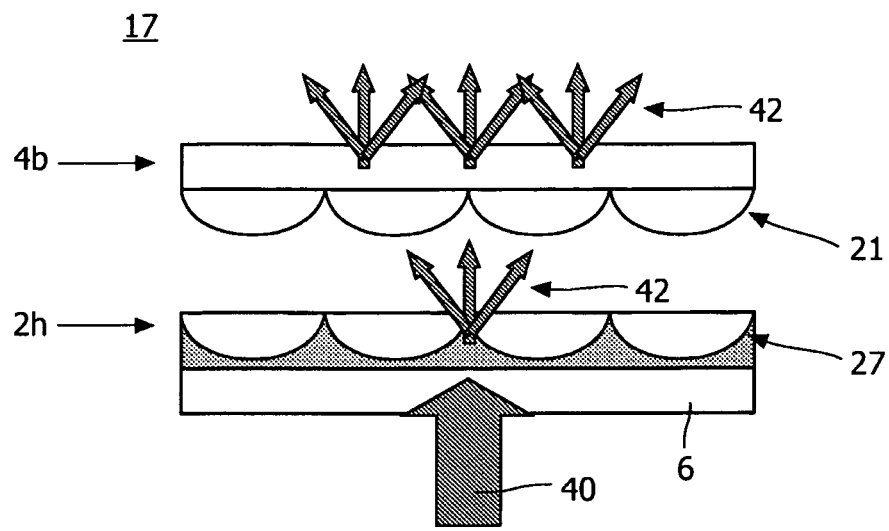
FIGS. 8A and 8B show schematic cross-sectional views of a beam-control element according to the invention, in which both the resilient layer and the further layer comprise complementary matching reliefs for reshaping the collimated light beam.
Figure 8B:
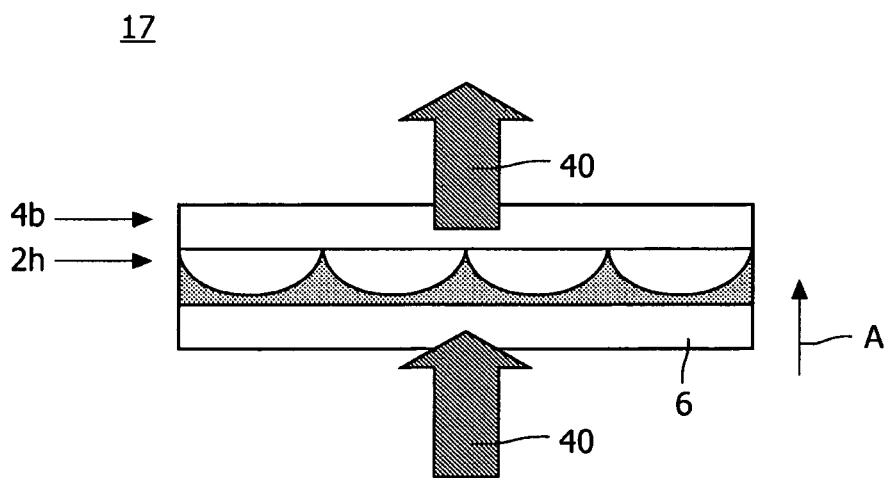

FIGS. 8A and 8B show schematic cross-sectional views of a beam-control element 17 according to the invention, in which both the resilient layer 2h and the further layer 4b comprise reliefs 21, 27 for controlling the light-beam 40. The further layer 4b is substantially identical to the further layer 4b as shown in FIGS. 3 and 4 and comprises a plurality of circular or cylindrical lens-shaped protrusions. The resilient layer 2h comprises a complementary relief 27 which is substantially complementary to the relief 21 of the further layer 4b. The complementary relief 27 of the resilient layer 2h comprises circular lens-shaped indentations or cylindrical lens-shaped indentations which substantially match the circular lens-shaped protrusions or the cylindrical lens-shaped protrusions of the further layer 4b. FIG. 8A shows the resilient layer 2h and the further layer 4b spaced apart such that the relief 21 and the complementary relief 27 control the shape and/or direction of the light beam 40 impinging on the beam-control element 17. FIG. 8B shows the resilient layer 2h pressed against the further layer 4b, in which the relief 21 substantially fits the complementary relief 27. When the refractive index of the resilient layer 2h and the further layer 4b are substantially identical, the light beam 40 impinging on the arrangement of the beam-control element 17 as shown in FIG. 8B passes the beam-control element 17 substantially unaltered. Due to the resilient character of the resilient layer 2h, any misalignment of the relief 21 with respect to the complementary relief 27 is corrected such that the relief 21 and the complementary relief 27 are substantially fully reduced.

Alternatively, the relief 27 of the resilient layer 2h may not be a complementary relief 27 of the relief 21 of the further layer 4b (not shown in FIGS. 8A and 8B). The reliefs 21, 27 may be chosen such that the required shaping or redirecting of the light beam 40 is obtained by the combination of the two reliefs 21, 27. In such an embodiment, the force required to press the resilient layer 2h against the further layer 4b for reducing the reliefs 21, 27 is less because any of the individual reliefs 21, 27 only needs to have protrusions and/or indentations which have half the depth. Using two different reliefs 21, 27 for reshaping or redirecting the light beam 40 enables a more complex controlling of the light beam 40 by the beam-control element 17.

The resilient layer 2h may be constituted of a single resilient material or of a fluid sealed in a flexible membrane. When the membrane is used for sealing a fluid, the membrane comprises the relief 27 of the resilient layer 2h.

Figure 9A:
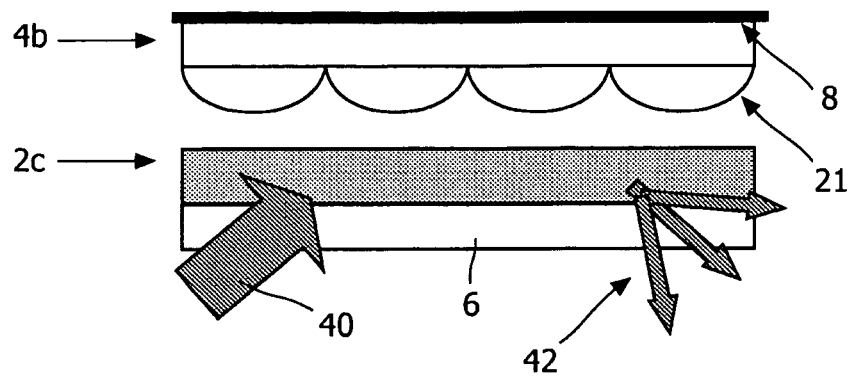
FIGS. 9A and 9B show schematic cross-sectional views of a beam-control element according to the invention, in which the beam-control element is used in reflection.
Figure 9B:
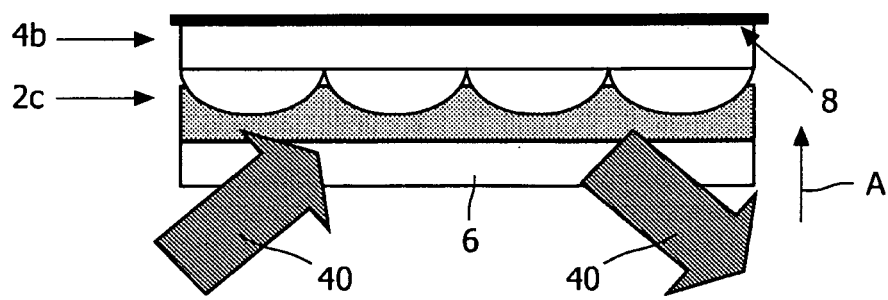

FIGS. 9A and 9B show schematic cross-sectional views of a beam-control element 18 according to the invention, in which the beam-control element 18 is used in reflection. The beam-control element 18 comprises the resilient layer 2c and the further layer 4b which comprises the relief 21. The beam-control element 18 shown in FIGS. 9A and 9B further comprises a reflective layer 8 for reflecting the impinging light beam 40. The resilient layer 2c and the further layer 4b are substantially identical to the resilient layer 2c and the further layer 4b shown in. However, in the embodiment shown in FIGS. 9A and 9B, the effect of the relief 21 on the shaping or redirecting of the impinging light beam 40 is substantially double that of the embodiment of FIGS. 3A and 3B, because the light passes the resilient layer 2c and the further layer 4b twice.

In the embodiment shown in FIGS. 9A and 9B, the light beam 40 impinges on the reflective layer 8 at an angle. The light beam 40 also impinges on the relief 21 at an angle, which may distort the reshaping of the light beam 40 by the beam-control element 18. The relief 21 may be adapted to compensate for such a distortion (this is not shown in the figure).

Figure 10A:
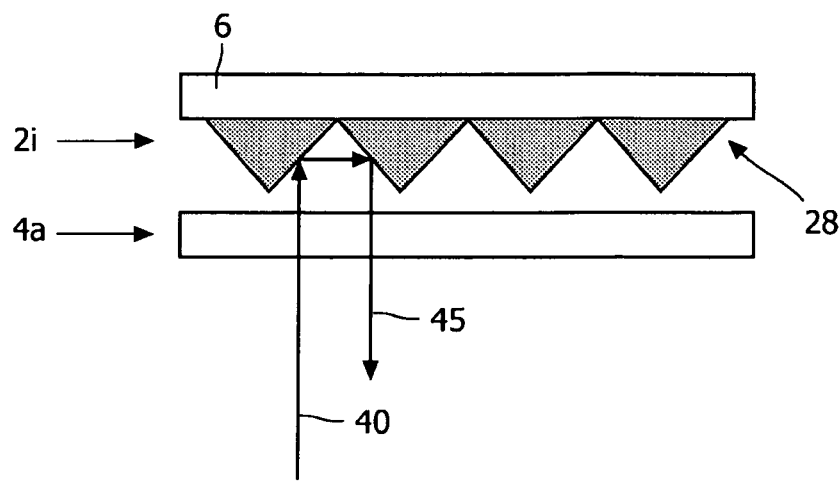
FIGS. 10A and 10B show schematic cross-sectional views of the beam-control element, in which the un-pressurized relief of the resilient layer is shaped to reflect the light beam via total internal reflection.
Figure 10B:
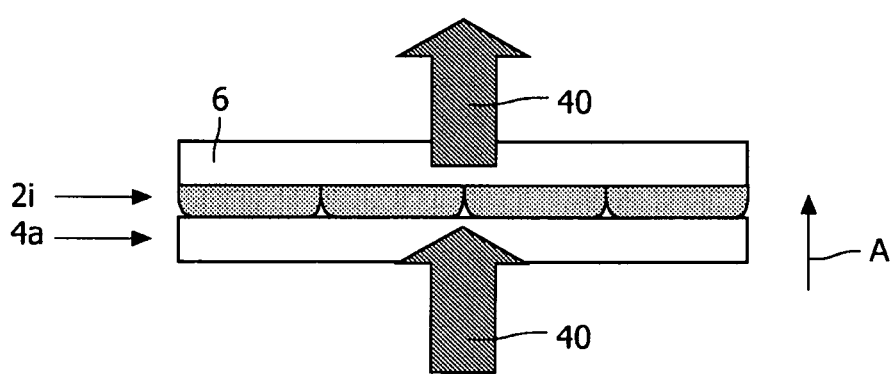

FIGS. 10A and 10B show schematic cross-sectional views of the beam-control element 19, in which the un-pressurized relief 28 of the resilient layer 2i is shaped to reflect the light beam 40 via total internal reflection. The prismatic shape of the relief 28 causes the light beam 40, which impinges substantially perpendicularly to the further layer 4a, to be reflected. A benefit of this embodiment is that reflection using total internal reflection is substantially lossless. When the resilient material of the resilient layer 2i is compressed by pressing the resilient layer 2i against the further layer 4a, the prismatic structures of the relief 28 are reduced to form a substantially homogeneous layer of resilient material as shown in FIG. 10B. The part of the relief 28 which is no longer prisma-shaped will start transmitting part of the light of the impinging light beam 40. So, during the reduction of the relief 28, the reflective characteristic of the resilient layer 2i slowly decreases and gradually more light of the impinging light beam is transmitted by the beam-control element 19. The embodiment of the beam-control element 19 as shown in FIGS. 10A and 10B can be used as an optical element to relatively easily vary the transmittance or reflectance of an impinging light-beam 40.

Figure 11A:
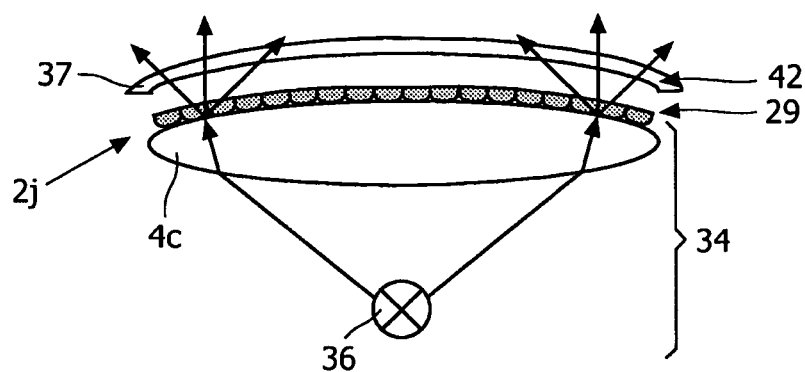
FIGS. 11A and 11B show schematic cross-sectional views of a beam-control element according to the invention, in which the resilient layer is arranged on a surface of a lens of the collimator for reshaping the collimated light beam.
Figure 11B:
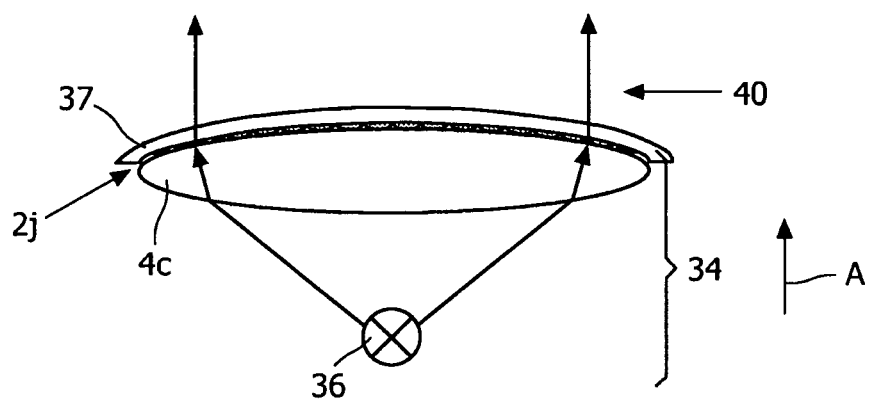

FIGS. 11A and 11B show schematic cross-sectional views of a beam-control element 20 according to the invention, in which the resilient layer 2j is arranged on a surface of the further layer 4c which is lens-shaped. The resilient layer 2j comprises the relief 29 for reshaping or redirecting the light beam emitted by the light source 34. The relief 29 is arranged at the interface between the resilient layer 2j and the further layer 4c. The light source 34 comprises the light-emitting element 36 and the lens-shaped further layer 4c which collimates the light emitted by the light-emitting element 36 to form a collimated light beam. The beam-control element 20 further comprises a translucent element 37 of which a surface facing the resilient layer 2j has a complementary shape with respect to the surface of the lens-shaped further layer 4c on which the resilient layer 2j is applied. The translucent element 37 is used for pressing the resilient layer 2j against the further layer 4c for reducing the relief 29.

FIG. 11A shows the beam-control element 20 in which the translucent element 37 is spaced apart from the resilient layer 2j. Due to this spacing between the translucent element 37 and the resilient layer 2j no pressure is applied between the resilient layer 2j and the further layer 4c, and the relief 29 controls the light beam emitted by the light source 34. FIG. 11B shows the beam-control element 20 in which the translucent element 37 is pressed against the further layer 4c, thus pressing the resilient layer 2j against the further layer 4c. Due to the applied pressure, the resilient material of the resilient layer 2j deforms, thereby reducing the relief 29. Due to the reduced relief 29, the resilient layer 2j forms a substantially homogeneous layer between the translucent element 37 and the further layer 4c, enabling the light beam 40 to pass substantially unaltered through the resilient layer 2j and the translucent element 37. Alternatively, the resilient layer 2j may be applied on the translucent element 37 (not shown) such that the resilient layer 2j in the arrangement of FIG. 11A is spaced apart from the further layer 4c.

Figure 12:
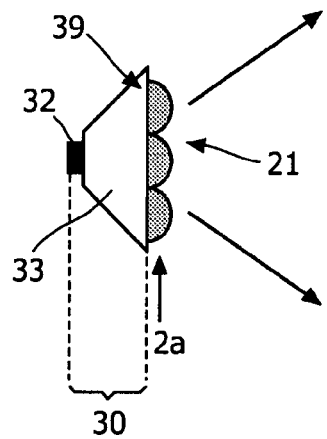
FIG. 12 shows a schematic cross-sectional view of a light source for use in the illumination system according to the invention.

FIG. 12 shows a schematic cross-sectional view of a light source 38 for use in the illumination system 50, 60 (see FIGS. 13 and 14) according to the invention. The light source 38 comprises a light-emitting element 32, for example, a light emitting diode 32, and comprises a collimator 33 for collimating the light emitted by the light-emitting element 32. The light source 38 further comprises a light exit window 39 comprising the resilient layer 2a. The resilient layer 2a comprises the relief 21 for controlling the shape and/or direction of the light beam emitted from the collimator 33. This light source 38 may, for example, be used as a retrofit light source 38 in a conventional illumination system. Generally, conventional illumination systems have a cover-glass for preventing a user from touching the light source, because the light source typically becomes relatively hot. The cover-glass may be arranged to be the further layer which may be pressed against the resilient layer 2a for reducing the relief and as such substantially restoring the shape and/or direction of the light beam. The light-emitting element 32 may also be an Ultra-high pressure discharge lamp 32. Typically, this Ultra-high pressure discharge lamp is positioned with relatively high accuracy inside a reflector 33 and the position of the Ultra-high pressure discharge lamp inside the reflector 33 is typically fixed. The reflector 33 is typically sealed with a cover (not shown) for preventing users from touching the Ultra-high pressure discharge lamp 32. On this cover the resilient layer 2a can be applied, such that the light emitted by the Ultra-high pressure discharge lamp can be controlled as indicated in the previous embodiments of the beam-control element.

Figure 13A:
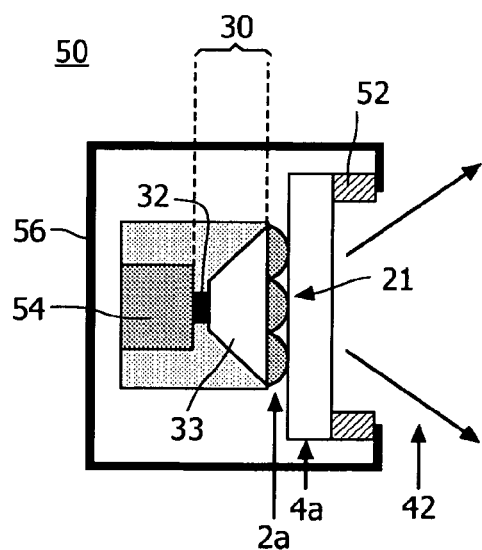
FIGS. 13A and 13B show schematic cross-sectional views of an illumination system according to the invention.
Figure 13B:
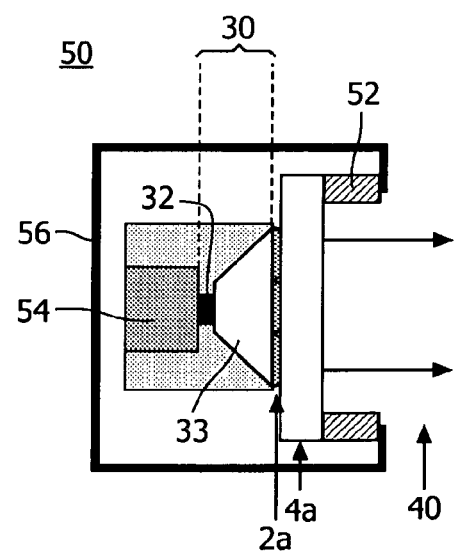

FIGS. 13A and 13B show schematic cross-sectional views of an illumination system 50 according to the invention. The illumination system 50 according to the invention comprises a light source 30 comprising the light-emitting element 32, for example a light emitting diode 32, and comprising the collimator 33. The illumination system 50 comprises the resilient layer 2a comprising the relief 21 for controlling the shape and/or direction of the light beam. The illumination system 50 further comprises the further layer 4a arranged parallel to the resilient layer 2a. The illumination system 50 further comprises moving means 52, for example piezo-electrical elements 52, for moving the further layer 4a with respect to the resilient layer 2a for pressing the further layer 4a against the resilient layer 2a for controlling a reduction of the relief 21 of the resilient layer 2a.

FIG. 13A shows an arrangement of the resilient layer 2a and the further layer 4a in which substantially no pressure is applied between the resilient layer 2a and the further layer 4a. As a consequence, the relief 21 is present for controlling the shape and/or direction of the light beam emitted from the light source 30. In the embodiment shown in FIG. 13A, the relief 21 comprises circular or cylindrical lens-shaped protrusions for widening the light beam emitted by the light source 30 to a diverging light beam 42. FIG. 13B shows an arrangement of the resilient layer 2a and the further layer 4a in which the further layer 4a is pressed against the resilient layer 2a, thereby reducing the relief 21. The applied pressure determines the level of reduction of the relief 21 and thus determines the level of restoring the shape and/or direction of the light beam 40 transmitted by the resilient layer 2a and the further layer 4a.

The illumination system 50 as shown in FIGS. 13A and 13B further comprises a housing 56 and drive electronics 54 for driving the light-emitting element 32.

Figure 14A:
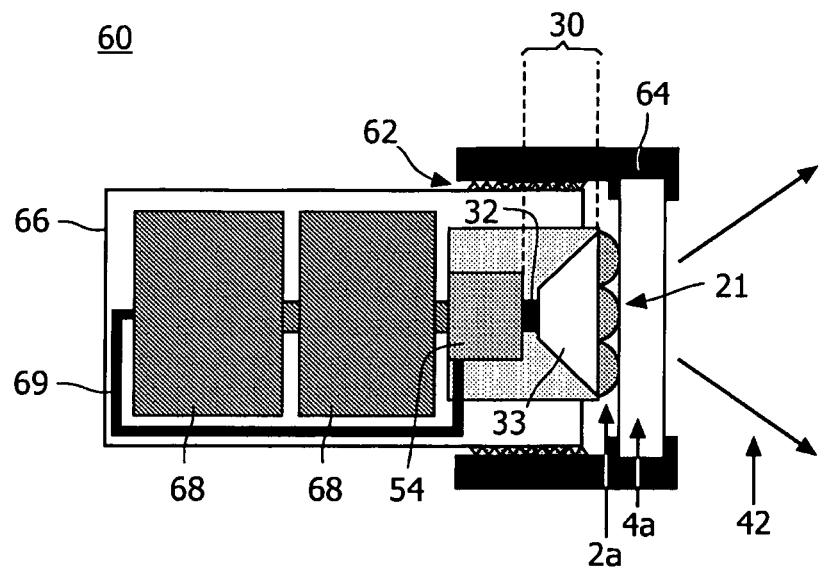
FIGS. 14A and 14B show schematic cross-sectional views of a flashlight comprising the illumination system according to the invention.
Figure 14B:
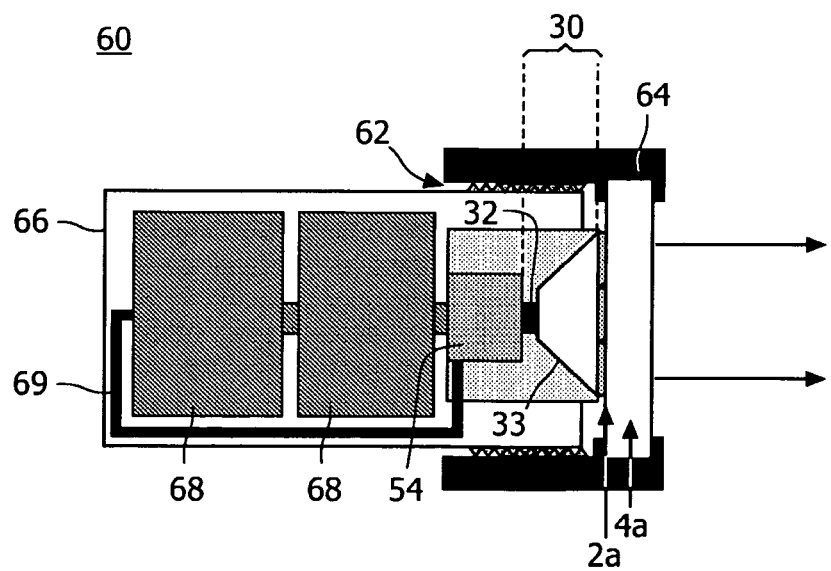

FIGS. 14A and 14B show schematic cross-sectional views of a flashlight 60 as the illumination system 60 according to the invention. The flashlight 60 according to the invention comprises a light source 30 comprising the light emitting diode 32 and the collimator 33. The flashlight 60 further comprises the resilient layer 2a comprising the relief 21 and comprises the further layer 4a arranged parallel to the resilient layer 2a. The flashlight 60 comprises moving means 62, for example a helical thread 62 along which a flange 64 is moved via a rotational movement. The further layer 4a is coupled to the flange 64 and translates with respect to the resilient layer 2a when the flange 64 is rotated along the helical thread 62. Due to the translational movement of the further layer 4a, the further layer 4a may be pressed against the resilient layer 2a for controlling a reduction of the relief 21 of the resilient layer 2a.

FIG. 14A shows an arrangement of the resilient layer 2a and the further layer 4a in which substantially no pressure is applied between the resilient layer 2a and the further layer 4a. As a consequence, the relief 21 is present for controlling the shape and/or direction of the light beam emitted from the light source 30. FIG. 8B shows an arrangement of the resilient layer 2a and the further layer 4a in which the further layer 4a is translated via the translation of the flange 64 along the thread 62 and is pressed against the resilient layer 2a, thereby reducing the relief 21. Again, the applied pressure between the further layer 4a and the resilient layer determines the level of reduction of the relief 21 and thus determines the level of restoring the shape and/or direction of the light beam 40 transmitted by the resilient layer 2a and the further layer 4a.

The flashlight 60 as shown in FIGS. 14A and 14B further comprises a housing 66 and drive electronics 54 for driving the light-emitting diode 32. The flashlight 60 further comprises energy storage 68, for example batteries 68, for supplying energy to the light-emitting diode 32. Finally, a conductive lead 69 is arranged for closing the electrical circuit of the batteries 68 and the drive electronics 54.

It should be noted that the above-mentioned embodiments illustrate rather than limit the invention, and that those skilled in the art will be able to design many alternative embodiments without departing from the scope of the appended claims.

The examples show a limited number of reliefs. However, it is clear to the person skilled in the art that also other reliefs for controlling the light beam may be used without departing from the scope of the invention.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An illumination system comprising
a light source for emitting a light beam and
a beam-control element for controlling the shape direction of the light-beam,
the light source being arranged for emitting at least part of the light beam via the beam-control element,
the beam-control element comprising
a resilient layer and
a further layer being arranged substantially parallel to the resilient layer in spaced apart opposing relationship,
the resilient layer comprising a deformable relief on an exterior surface of the resilient layer arranged substantially parallel to the further layer, or the further layer comprising the relief on an exterior surface of the further layer facing the resilient layer,
the resilient layer forming the deformable relief by a plurality of sealed compartments,
the relief being arranged for altering the shape or direction of the light beam,
the illumination system further includes a moving mechanism operable to move the resilient layer and the further layer with respect to each other reducing the relief by pressing the exterior surface of the further layer against the exterior surface of the resilient layer thereby reducing the cross-sectional dimension of the relief.

2. Illumination system as claimed in claim 1, wherein the moving mechanism is arranged for moving the resilient layer and the further layer with respect to each other in the axial direction (A) being a direction substantially parallel to the light beam for applying pressure.

3. Illumination system as claimed in claim 1, wherein the moving mechanism is arranged for moving the resilient layer and the further layer with respect to each other in the transversal direction (T) or rotational direction for altering the relief, the transversal direction (T) and rotational direction being directions substantially perpendicular to the light beam.

4. Illumination system as claimed in claim 1, wherein the surface of the resilient layer comprising the relief is embedded in the resilient layer.

5. Illumination system as claimed in claim 4, wherein the resilient layer being a translucent layer comprises embedded compartments forming the relief.

6. Illumination system as claimed in claim 5, wherein the compartments comprise a fluid that is evacuated from the compartments by pressing the resilient layer for reducing the relief.

7. Illumination system as claimed in claim 1, wherein the further layer is relatively rigid compared to the resilient layer.

8. Illumination system as claimed in claim 7, wherein the refractive index of the resilient layer is substantially identical to the refractive index of the further layer.

9. Illumination system as claimed in claim 1, wherein the relief is constituted of an arrangement of circular lens-shaped, cylindrical lens-shaped, prism-shaped (24), or substantially randomly shaped protrusions, indentations, or compartments.

10. Illumination system as claimed in claim 1, wherein the moving mechanism moves the resilient layer relative to the further layer via a rotational motion causing a translational motion along a thread, a piezo-electric element, an electromagnetic force, or a motor.

11. Illumination system as claimed in claim 1, wherein both the surface of the resilient layer arranged substantially parallel to the further layer and the surface of the further layer facing the resilient layer comprise the relief.

12. The illumination system of claim 1 wherein the resilient layer is deformable and the further layer has a plurality of rigid lenses, the resilient layer deformable around the further layer rigid lenses.

13. An illumination system, comprising:
a light source for emitting a light beam;
a beam-control element for controlling the light-beam;
the light source arranged to emit at least part of the light beam via the beam-control element;
the beam-control element including
a resilient layer;
a further layer arranged substantially parallel to the resilient layer;
the resilient layer including a deformable relief on an exterior surface of the resilient layer and arranged substantially parallel to the further layer;
the relief arranged to be deformable thereby altering the direction of the light beam;
the illumination system further including moving mechanism to move the resilient layer and the further layer with respect to each other for deforming the relief by pressing the exterior layer of the further layer against the exterior layer of the resilient layer;
the relief on the surface of the resilient layer embedded in the resilient layer;
the resilient layer being a translucent layer including sealed embedded compartments, the sealed compartments retaining fluid in the compartments when pressing the resilient layer against the further layer to transform the relief.

14. An illumination system, comprising:
a light source for emitting a light beam;
a beam-control element for controlling the light-beam;
the light source arranged to emit at least part of the light beam via the beam-control element;
the beam-control element including
a resilient layer;
a further layer arranged substantially parallel to the resilient layer;
the resilient layer including a deformable relief on an exterior surface of the resilient layer and arranged substantially parallel to the further layer;
the relief arranged to be deformable thereby altering the direction of the light beam;
the illumination system further including moving mechanism to move the resilient layer and the further layer with respect to each other for deforming the relief by pressing the exterior layer of the further layer against the exterior layer of the resilient layer;
the relief on the surface of the resilient layer embedded in the resilient layer;
the resilient layer being a translucent layer including sealed embedded compartments, the sealed compartments retaining fluid in the compartments when pressing the resilient layer against the further layer to transform the relief,
wherein the resilient layer interior compartments having a refractive index different than a refractive index of the resilient layer, said resilient layer deformable into a substantially homogeneous layer inside the resilient layer allowing the light beam to pass through unaltered.

* * * * *